(12) United States Patent
Gomes et al.

(10) Patent No.: US 12,515,812 B2
(45) Date of Patent: Jan. 6, 2026

(54) MINIMUM EQUIPMENT LIST SYSTEMS FOR AIRCRAFT

(71) Applicant: Hamilton Sundstrand Corporation, Charlotte, NC (US)

(72) Inventors: Alex Gomes, Chicago, IL (US); Michael J. Scully, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 209 days.

(21) Appl. No.: 18/367,334

(22) Filed: Sep. 12, 2023

(65) Prior Publication Data

US 2025/0083833 A1 Mar. 13, 2025

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
CPC ............ B64D 45/00; B64D 2045/0085; B64D 2221/00; H02H 3/04; B64F 5/60
See application file for complete search history.

(56) References Cited

U.S. PATENT DOCUMENTS

| 4,740,883 | A | * | 4/1988 | McCollum | H03K 17/08 307/26 |
| 7,656,637 | B2 | | 2/2010 | McAvoy et al. | |
| 7,813,871 | B2 | | 10/2010 | Small et al. | |
| 8,514,104 | B1 | * | 8/2013 | Dirks | G08G 5/32 340/945 |
| 8,798,811 | B2 | | 8/2014 | Vial | |
| 8,996,340 | B2 | | 3/2015 | Cheriere et al. | |
| 9,188,977 | B2 | | 11/2015 | Rigal et al. | |
| 9,552,271 | B1 | * | 1/2017 | Fetta | G05B 19/0428 |
| 9,950,809 | B2 | | 4/2018 | Breban | |
| 10,839,624 | B2 | | 11/2020 | Huang et al. | |
| 11,603,213 | B2 | | 3/2023 | Shavit | |
| 2006/0087782 | A1 | * | 4/2006 | Michalko | H02H 3/04 361/62 |

(Continued)

OTHER PUBLICATIONS

Supplementary European Search Report dated Nov. 14, 2024 in connection with European Patent Application No. 24188995.5, 8 pages.

*Primary Examiner* — Donald J Wallace
*Assistant Examiner* — Jalal C Coduroglu

(57) ABSTRACT

An automated minimum equipment list (MEL) system for an aircraft can include a control module operatively connected to a plurality of aircraft components. The control module can be configured to receive information relating to the plurality of aircraft components, and determine that one or more inoperative components exist in the plurality of aircraft components based on the information relating to the plurality of aircraft components. The control module can be configured to automatically determine whether one or more MEL dispatch conditions exist based on a stored MEL and the one or more inoperative components. The control module can be configured to control at least one of the plurality of aircraft components to configure the plurality of aircraft components to comply with at least one MEL dispatch condition if one or more MEL dispatch conditions exist to allow the aircraft to dispatch with the one or more inoperative components.

20 Claims, 4 Drawing Sheets

(56) References Cited

U.S. PATENT DOCUMENTS

| | | |
|---|---|---|
| 2009/0189455 A1* | 7/2009 | Rusan .................. H02J 9/06 |
| | | 307/82 |
| 2009/0326738 A1 | 12/2009 | Ferro |
| 2010/0049379 A1* | 2/2010 | Vial ................. G07C 5/0816 |
| | | 701/3 |
| 2013/0274992 A1* | 10/2013 | Cheriere ............ G06F 11/0739 |
| | | 701/32.9 |
| 2014/0103990 A1 | 4/2014 | Holley et al. |
| 2017/0295672 A1* | 10/2017 | Pal ...................... B64D 41/00 |
| 2019/0157904 A1* | 5/2019 | Qian ...................... H02J 3/02 |
| 2020/0023992 A1* | 1/2020 | Conaway ............... B64D 45/00 |
| 2021/0265830 A1* | 8/2021 | Mazur .................... H02H 3/10 |
| 2022/0371446 A1* | 11/2022 | Culpin .................... B60L 3/04 |
| 2024/0083589 A1* | 3/2024 | Roadley-Battin ....... B60L 50/00 |
| 2024/0331453 A1* | 10/2024 | Underwood ............. B64F 5/60 |

* cited by examiner

MINIMUM EQUIPMENT LIST SYSTEMS FOR AIRCRAFT

FIELD

This disclosure relates to minimum equipment list (MEL) systems for aircraft.

BACKGROUND

A minimum equipment list (MEL) is a list which provides for the operation of aircraft, subject to specified conditions, with particular equipment inoperative prepared by an operator in conformity with, or more restrictive than, the master minimum equipment list (MMEL) established for the aircraft type. The MMEL is a list established for a particular aircraft type by the organization responsible for the type design which identifies items which individually may be unserviceable at the commencement of a flight. The MMEL may be associated with special operating conditions, limitations or procedures.

In current aircraft operation, when there's a failed component or function, the ground crew verifies if this component or function is listed as part of the MEL or MMEL for the specific aircraft. Upon confirmation of the dispatch condition, the ground crew will manually disable the solid state power controller (SSPC)/circuit breaker by setting it to out and lock. The whole MMEL procedure is performed manually.

Such conventional methods and systems have generally been considered satisfactory for their intended purpose. However, there is still a need in the art for improvements. The present disclosure provides a solution for this need.

SUMMARY

An automated minimum equipment list (MEL) system for an aircraft can include a control module operatively connected to a plurality of aircraft components. The control module can be configured to receive information relating to the plurality of aircraft components, and determine that one or more inoperative components exist in the plurality of aircraft components based on the information relating to the plurality of aircraft components. The control module can be configured to automatically determine whether one or more MEL dispatch conditions exist based on a stored MEL and the one or more inoperative components. The control module can be configured to control at least one of the plurality of aircraft components to configure the plurality of aircraft components to comply with at least one MEL dispatch condition if one or more MEL dispatch conditions exist to allow the aircraft to dispatch with the one or more inoperative components.

In certain embodiments, the plurality of aircraft components can include one or more electrical breakers. In certain embodiments, the one or more electrical breakers can include one or more solid state power controllers (SSPCs).

In certain embodiments, the control module can be configured to detect an open state of the one or more electrical breakers, a trip state of the one or more electrical breakers, a fail state of the one or more electrical breakers, and/or a failed state of a respective load connected to the one or more electrical breakers. In certain embodiments, the control module can be configured to detect that at least one of the one or more circuit breakers is in a tripped position.

In certain embodiments, the control module can be configured to detect that a user commanded an out/lock position of at least one of the one or more circuit breakers. In certain embodiments, the control module can be configured to detect that at least one of the one or more circuit breakers failed open. In certain embodiments, the control module can be configured to detect that load current data associated with at least one of the one or more circuit breakers is below a minimum expected threshold.

In certain embodiments, the control module can be configured to generate a user interface indicating one or more MEL dispatch conditions, wherein the user interface is configured for user selection and/or confirmation of the one or more MEL dispatch conditions before controlling the at least one of the plurality of components. In certain embodiments, the user interface can be further configured to display a status of one or more relevant circuit breakers of the one or more circuit breakers associated with a selected MEL dispatch condition.

In certain embodiments, the control module can be configured such that if at least one MEL dispatch condition does not exist, the control module outputts an alert indicating that the aircraft cannot dispatch. In certain embodiments, the stored MEL can be an operator MEL or a master MEL.

In accordance with at least one aspect of this disclosure, a method can include receiving information relating to a plurality of aircraft components, determining that one or more inoperative components exist in the plurality of aircraft components based on the information relating to the plurality of aircraft components, automatically determining whether one or more MEL dispatch conditions exist based on a stored MEL and the one or more inoperative components, and controlling at least one of the plurality of aircraft components to configure the plurality of aircraft components to comply with at least one MEL dispatch condition once one or more MEL dispatch conditions exist to allow the aircraft to dispatch with the one or more inoperative components.

In certain embodiments, determining that one or more inoperative components exist can include detecting open state of the one or more electrical breakers, a trip state of the one or more electrical breakers, a fail state of the one or more electrical breakers, and/or a failed state of a respective load connected to the one or more electrical breakers. In certain embodiments, determining that one or more inoperative components exist can include detecting that at least one of the one or more circuit breakers is in a tripped position. In certain embodiments, determining that one or more inoperative components exist can include detecting that a user commanded an out/lock position of at least one of the one or more circuit breakers. In certain embodiments, determining that one or more inoperative components exist can include detecting that at least one of the one or more circuit breakers failed open.

In certain embodiments, determining that one or more inoperative components exist can include detecting that load current data associated with at least one of the one or more circuit breakers is below a minimum expected threshold. In certain embodiments, the method can further include generating a user interface indicating one or more MEL dispatch conditions, wherein the user interface is configured for user selection and/or confirmation of the one or more MEL dispatch conditions before controlling the at least one of the plurality of components.

In accordance with at least one aspect of this disclosure, a control module for an automated minimum equipment list (MEL) system of an aircraft can include a non-transitory computer readable medium configured to store computer executable instructions to cause a computer to perform a method. The method can be any suitable embodiment of a method disclosed herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
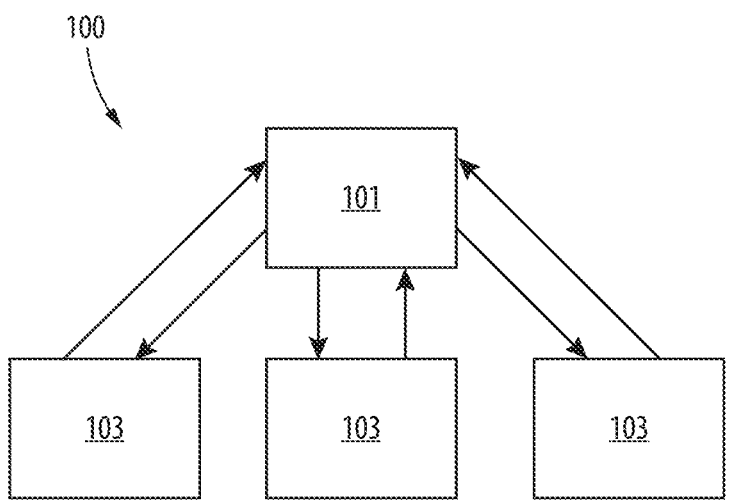
FIG. 1 is a schematic diagram view of an embodiment of a system in accordance with this disclosure.
Figure 2:
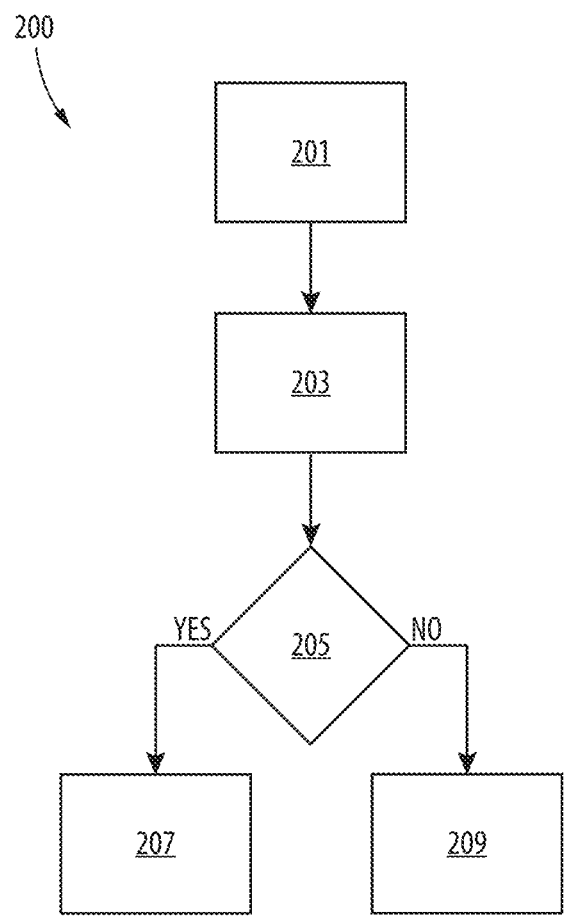
FIG. 2 is a flow diagram of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other views, embodiments, and/or aspects of this disclosure are illustrated in FIGS. 2-5.

Referring to FIG. 1, an automated minimum equipment list (MEL) system 100 for an aircraft can include a control module 101 operatively connected to a plurality of aircraft components 103. In certain embodiments, referring additionally to FIG. 2, the control module 101 can be configured to perform a method 200 and/or be configured to function in accordance with a method 200 as disclosed herein, for example. The method 200 can include receiving (e.g., at block 201) information relating to the plurality of aircraft components 103, and determining (e.g., at block 203) that one or more inoperative components exist in the plurality of aircraft components 103 based on the information relating to the plurality of aircraft components 103.

The method 200 can include automatically determining (e.g., at block 205) whether one or more MEL dispatch conditions exist based on a stored MEL and the one or more inoperative components (e.g., by comparing the one or more inoperative components to the MEL). As shown in FIG. 1, if one or more MEL dispatch conditions exist, the method 200 can include controlling (e.g., at block 207) at least one of the plurality of aircraft components 103 to configure the plurality of aircraft components 103 to comply with at least one MEL dispatch condition to allow the aircraft to dispatch with the one or more inoperative components. For example, the method 100 can include controlling at least one of the plurality of aircraft components to configure the plurality of aircraft components to comply with at least one MEL dispatch condition once one or more MEL dispatch conditions exist to allow the aircraft to dispatch with the one or more inoperative components. In certain embodiments, if at least one MEL dispatch condition does not exist, the method 200 further comprises outputting (e.g., at block 209) an alert indicating that the aircraft cannot dispatch. In certain embodiments, the stored MEL can be an operator MEL or a master MEL. Any suitable other reference equipment list having conditions for airworthiness is contemplated herein.

In certain embodiments, the plurality of aircraft components 103 can include one or more electrical breakers. In certain embodiments, the one or more electrical breakers can include one or more solid state power controllers (SSPCs), for example.

In certain embodiments, determining (e.g., at block 203) that one or more inoperative components exist can include detecting an open state of the one or more electrical breakers, a trip state of the one or more electrical breakers, a fail state of the one or more electrical breakers, and/or a failed state of a respective load connected to the one or more electrical breakers. In certain embodiments, determining (e.g., at block 203) that one or more inoperative components exist can include detecting that at least one of the one or more circuit breakers is in a tripped position.

In certain embodiments, determining (e.g., at block 203) that one or more inoperative components exist can include detecting that a user commanded an out/lock position of at least one of the one or more circuit breakers. In certain embodiments, determining (e.g., at block 203) that one or more inoperative components exist can include detecting that at least one of the one or more circuit breakers failed open. In certain embodiments, determining (e.g., at block 203) that one or more inoperative components exist can include detecting that load current data associated with at least one of the one or more circuit breakers is below a minimum expected threshold. Using other suitable faults and/or characteristics for determining (e.g., at block 203) that one or more inoperative components exist is contemplated herein.

Figure 3:
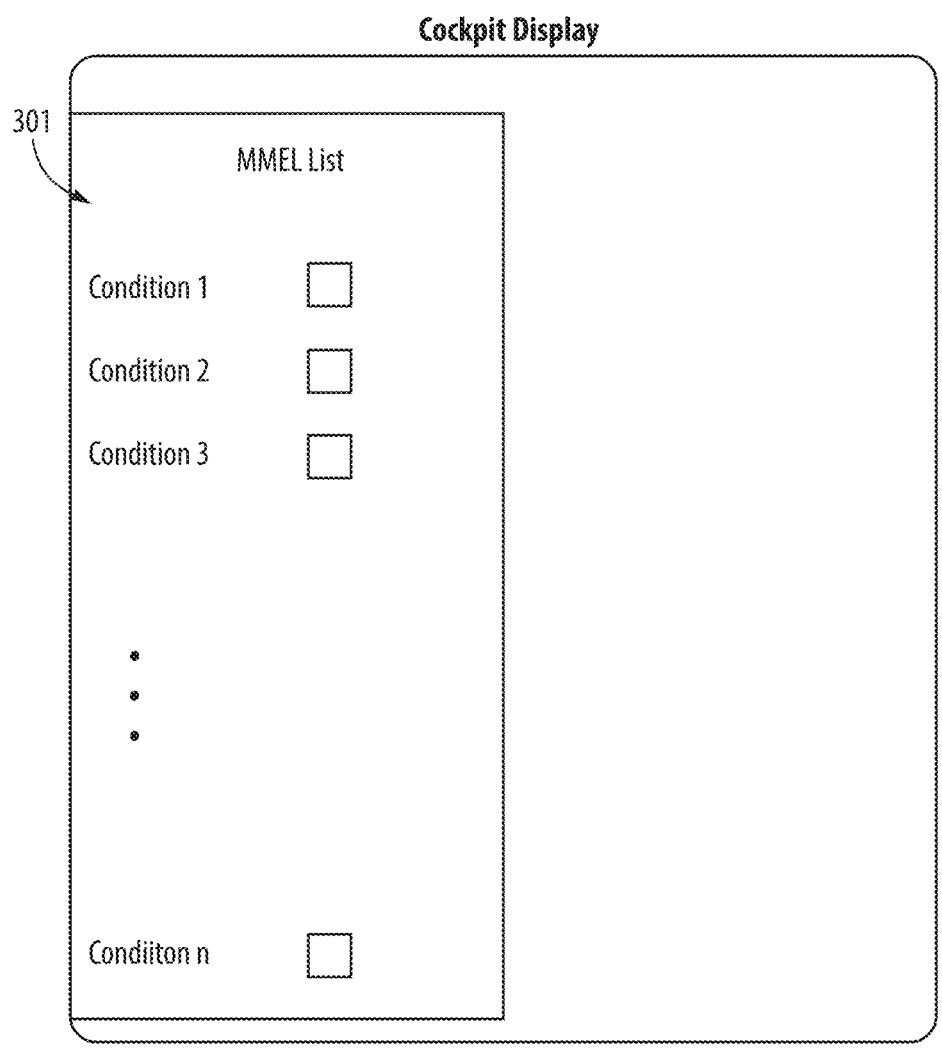
FIG. 3 is an illustration of an embodiment of a graphical user interface in accordance with this disclosure.

In certain embodiments, referring additionally to FIG. 3, the method 200 can further include generating a user interface 300 (e.g., for a cockpit display) indicating one or more MEL dispatch conditions 301 (e.g., shown as Condition 1-Condition n in pane 302). The user interface 300 can be configured for user selection and/or confirmation of the one or more MEL dispatch conditions 301 before controlling the at least one of the plurality of components 103. In certain embodiments, e.g., as shown in FIGS. 4 and 5, the user interface 300 can be further configured to display a status 303 (e.g., out, in, locked, or unlocked condition of a circuit breaker) of one or more relevant circuit breakers (e.g., shown in pane 304) of the one or more circuit breakers associated with a selected MEL dispatch condition 301.

Figure 4:
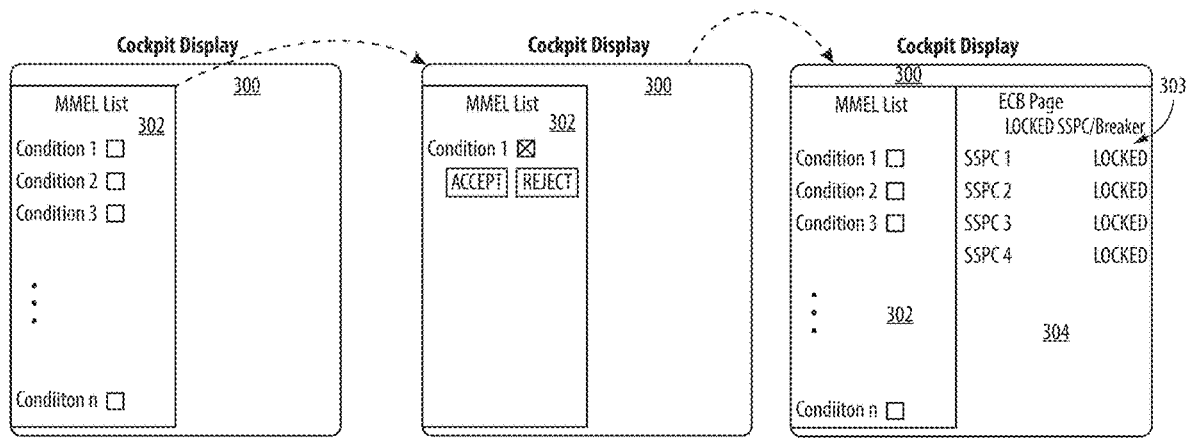
FIG. 4 is an illustration of an animation of the graphical user interface of FIG. 3, showing a selection of a condition, a confirmation of the selected condition, and display of the status of associated components with the selected condition after confirmation.
Figure 5:
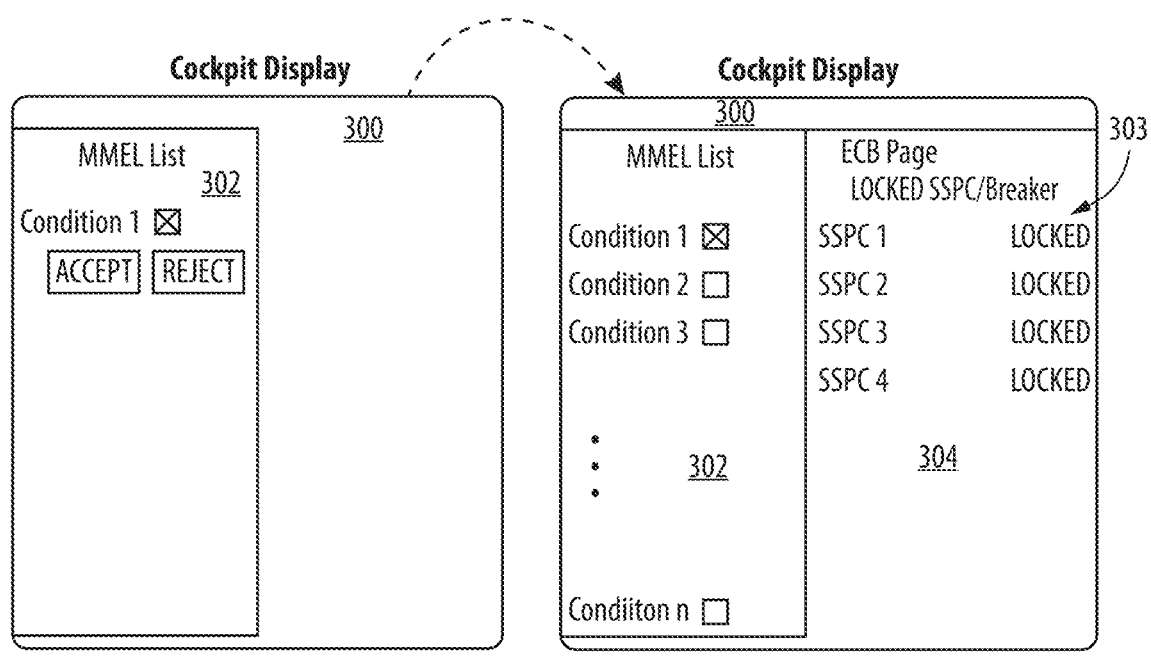
FIG. 5 is an illustration of an animation of the graphical user interface of FIG. 3, showing a confirmation of an already selected condition, and display of the status of associated components with the selected condition after confirmation.

FIG. 4 is an illustration of an animation of the user interface 300 of FIG. 3, showing a selection of a condition, a confirmation of the selected condition, and display of the status of associated components with the selected condition after confirmation. When a condition is selected, the system can asks the user for a confirmation to ACCEPT or REJECT, e.g., as shown. If user selects ACCEPT, the system can have this condition SELECTED and can open a new window (e.g., pane 304) with the electronic circuit breaker (ECB) pages, pre-filtered with the SSPC/breakers in LOCK condition for user to verify if the associated ones were indeed automatically LOCKED by the selection of the MEL dispatch condition, FIG. 5 is an illustration of an animation of the user interface 300 of FIG. 3, showing a confirmation of an already selected condition, and display of the status of associated components with the selected condition after confirmation. When an SSPC/breaker is selected OUT (from ECB page), or FAIL OPEN, or the current is below the minimum expected value, the system can send associated cockpit and maintenance messages. The system can be configured to ensure the associated SSPCs/breakers assigned as backup are selected IN. If the assigned SSPCs/breakers doesn't exist, or the case is not determined to be MEL dispatchable, then the system can trigger associated EICAS (Engine Indicating and Crew Alerting System) messages which prevent the aircraft dispatch. If the assigned SSPCs/breakers backup are selected IN, then if the case is also part of a known MEL condition (e.g., from the stored MEL database), then system can open the MEL list page on user interface 300 of the cockpit display and pre-select the associated condition. In such a case with the condition pre-selected, the user interface 300 can ask the user for a confirmation to ACCEPT or REJECT (e.g., in pane 302), If the user clicks on ACCEPT, the system can have this condition as SELECTED and the user interface 300 can open a new window (e.g., pane 304) with the ECB pages, pre-filtered with the SSPC/Breakers in LOCK condition for the user to verify if the associated ones were indeed automatically LOCKED by the selection of the MMEL condition.

In accordance with at least one aspect of this disclosure, a control module (e.g., module 101) for an automated minimum equipment list (MEL) system (e.g., system 100) of an aircraft can include a non-transitory computer readable medium configured to store computer executable instructions to cause a computer to perform a method. The method can be any suitable embodiment of a method disclosed herein.

The system would hold all the MEL lists in memory. Then the logic correlates faults to the MEL lists. It will automatically provide information about whether you can still fly and how according to the MEL conditions. Then it provides a button (e.g., digital) to automatically take action to make the acceptable condition under the MEL (like pulling the electronic breakers, turning on a backup breaker, checking health of other systems). Wouldnt want to automate decision to make MEL conditions for safety. This system cannot control some systems automatically like removing valves/locking valves, for example. These would still have to be manual. Broadest claim is to correlate faults to MEL and determine whether dispatch is still possible and output an indicator/button to press.'

In current aircraft operation, when there's a failed component or function, the ground-crew verifies if this component or function is listed as part of the MMEL (Master Minimum Equipment List) for the specific aircraft tail-number (S/N), and upon confirmation of the dispatch condition, the ground-crew will manually disable the SSPC or breaker by setting it to out and lock it. This procedure is performed manually, such that for a failed component, the ground-crew will need to go through all SSPC/breaker lists, select the ones applicable to the MMEL condition, and when a SSPC/breaker is found, the ground crew will then set it to OUT and LOCK (which typically also requires two actions, one to change it from IN to OUT, then another one to change it from OUT to LOCK). Also, the system doesn't have capabilities to automatically detect a potential MMEL dispatch case, when a SSPC/breaker is failed OPEN or tripped OUT, and then provide ground-crew important information to decide if the case is already part of a MMEL condition.

Certain embodiments can automatically detect a MMEL dispatch condition when a SSPC/breaker is tripped OUT, newly commanded OUT/LOCK, fails OPEN, or load current data is below the minimum expected value. In certain embodiments, once the MMEL dispatch condition is detected, then the system can automatically ensure the any associated backup load is turned ON to ensure aircraft function is not lost, send a message to cockpit and maintenance, requesting acknowledgement, and when acknowledged, turn the failed SSPC to LOCK (when is not done previously) as well as set the appropriate cockpit and maintenance messages.

Certain embodiments can display all MMEL dispatch conditions associated to the particular aircraft configuration (also known as tail-number or S/N). Ground crew can go through the MMEL dispatch conditions list and when a condition is selected, the system can request acknowledgement if the MMEL condition is to be set TRUE, automatically go through the list of associated SSPC/breakers and put them all to OUT and LOCK, automatically set the appropriate cockpit and maintenance messages, and automatically open the ECB page in the cockpit display and list all SSPC/breakers in OUT and LOCK position for the ground crew's verification.

Certain embodiments can include storing in the system memory all MMEL dispatch conditions associated to the aircraft configuration. Certain embodiments can be configured to allow the ground crew to see this MMEL list electronically in any cockpit display. Certain embodiments can be configured to allow the ground crew to select any MMEL dispatch condition from the list and confirm the selection. Certain embodiments can be configured to store in the system memory all SSPC/breakers database with any MMEL dispatch condition associated to them. Certain embodiments can be configured such that once the MMEL dispatch condition is selected, the associated SSPCs/breakers can be automatically set to OUT and LOCK by the system. When the SSPC is set to LOCK, the system can automatically open the list of SSPC/breaker pre-filtered to LOCK to allow ground crew to verify the SSPC/breaker is indeed put to LOCK. Certain embodiments can be configured to use the SSPC/breaker database list that is stored in the system so that when any SSPC/breaker is newly detected OPEN/Fail-OPEN/TRIP/LOCK or if measured current is below minimum expected value (this value is also stored in the database), then the system can send associated messages to cockpit and maintenance and evaluate if it is an MMEL dispatch condition (by checking the data on the MMEL database against the SSPC/breaker). If it is an MMEL dispatch condition, then system can set the condition to TRUE and command the SSPC/breaker to OUT and LOCK (if not already locked).

Certain embodiments can be configured to check on the SSPC/breaker database, if there is any other SSPC/breaker which is part of the backup for the failed function. If so, the system can ensure this SSPC/breaker is functional (not-FAILED) and its condition is IN (not OPEN, not LOCK).

Certain embodiments can be configured to open the MMEL page and request acknowledge from ground-crew of the associated dispatch condition. Any new entries to the SSPC/breaker database can add the MMEL condition associated to the SSPC/breaker and which other SSPC(s)/breaker(s) is/are part of a backup function. Certain embodiments can be configured such that if there are any new entries to the MMEL database, the system can add the SSPC/breaker associated to the MMEL condition.

Embodiments can reduce significant ground crew time to detect and configure the aircraft in MMEL dispatch conditions. Embodiments also allow the system to automatically reconfigure the aircraft in a known MMEL dispatch condition, also reducing ground crew workload. Embodiments can provide automation and reduction of aircraft down-time to configure the aircraft to operate in known MMEL dispatch conditions. Currently used architectures do not automatically detect MMEL conditions and reconfigure the system automatically, for example.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An automated minimum equipment list (MEL) system for an aircraft, comprising:
a control module operatively connected to a plurality of aircraft components and configured to:
receive information relating to the plurality of aircraft components;
determine that one or more inoperative components exist in the plurality of aircraft components based on the information relating to the plurality of aircraft components;
automatically determine whether one or more MEL dispatch conditions exist based on a stored MEL and the one or more inoperative components;
generate a user interface that indicates the one or more MEL dispatch conditions and displays a status of the one or more inoperative components; and
control at least one of the plurality of aircraft components to configure the plurality of aircraft components to comply with at least one MEL dispatch condition once one or more MEL dispatch conditions exist to allow the aircraft to dispatch with the one or more inoperative components.

2. The system of claim 1, wherein the plurality of aircraft components includes one or more electrical breakers.

3. The system of claim 2, wherein the one or more electrical breakers include one or more solid state power controllers (SSPCs).

4. The system of claim 2, wherein the control module is configured to detect an open state of the one or more electrical breakers, a trip state of the one or more electrical breakers, a fail state of the one or more electrical breakers, and/or a failed state of a respective load connected to the one or more electrical breakers.

5. The system of claim 2, wherein the control module is configured to detect that at least one of the one or more circuit electrical breakers is in a tripped position.

6. The system of claim 2, wherein the control module is configured to detect that a user commanded an out/lock position of at least one of the one or more electrical breakers.

7. The system of claim 2, wherein the control module is configured to detect that at least one of the one or more electrical breakers failed open.

8. The system of claim 2, wherein the control module is configured to detect that load current data associated with at least one of the one or more electrical breakers is below a minimum expected threshold.

9. The system of claim 2, wherein the user interface is configured for user selection and/or confirmation of the one or more MEL dispatch conditions before controlling the at least one of the plurality of aircraft components.

10. The system of claim 9, wherein the user interface is further configured to display a status of one or more relevant electrical breakers of the one or more electrical breakers associated with a selected MEL dispatch condition.

11. The system of claim 1, wherein the control module is configured such that, if at least one MEL dispatch condition does not exist, the control module outputs an alert indicating that the aircraft cannot dispatch.

12. The system of claim 1, wherein the stored MEL comprises an operator MEL or a master MEL.

13. A control module for an automated minimum equipment list (MEL) system of an aircraft, the control module comprising a non-transitory computer readable medium configured to store computer executable instructions to perform a method, the method comprising:
receiving information relating to a plurality of aircraft components;
determining that one or more inoperative components exist in the plurality of aircraft components based on the information relating to the plurality of aircraft components;
automatically determining whether one or more MEL dispatch conditions exist based on a stored MEL and the one or more inoperative components;
generating a user interface that indicates the one or more MEL dispatch conditions, wherein the user interface is configured for user selection and/or confirmation of the one or more MEL dispatch conditions; and
controlling at least one of the plurality of aircraft components to configure the plurality of aircraft components to comply with at least one MEL dispatch condition once one or more MEL dispatch conditions exist to allow the aircraft to dispatch with the one or more inoperative components.

14. The control module of claim 13, wherein the plurality of aircraft components includes one or more electrical breakers.

15. The control module of claim 14, wherein the one or more electrical breakers include one or more solid state power controllers (SSPCs).

16. The control module of claim 14, wherein determining that the one or more inoperative components exist includes detecting open state of the one or more electrical breakers, a trip state of the one or more electrical breakers, a fail state of the one or more electrical breakers, and/or a failed state of a respective load connected to the one or more electrical breakers.

17. The control module of claim 14, wherein determining that the one or more inoperative components exist includes detecting that at least one of the one or more electrical breakers is in a tripped position.

18. The control module of claim 14, wherein determining that the one or more inoperative components exist includes detecting that a user commanded an out/lock position of at least one of the one or more electrical breakers.

19. The control module of claim 14, wherein determining that the one or more inoperative components exist includes detecting that at least one of the one or more electrical breakers failed open.

20. A method, comprising:
receiving information relating to a plurality of aircraft components;
determining that one or more inoperative components exist in the plurality of aircraft components based on the information relating to the plurality of aircraft components;
automatically determining whether one or more MEL dispatch conditions exist based on a stored MEL and the one or more inoperative components;
generating a user interface that indicates the one or more MEL dispatch conditions and displays a status of the one or more inoperative components, wherein the user interface is configured for user selection and/or confirmation of the one or more MEL dispatch conditions; and
controlling at least one of the plurality of aircraft components to configure the plurality of aircraft components to comply with at least one MEL dispatch condition once one or more MEL dispatch conditions exist to allow an aircraft to dispatch with the one or more inoperative components.

\* \* \* \* \*